United States Patent [19]

Dorn et al.

[11] 3,779,946
[45] Dec. 18, 1973

[54] PRODUCTION OF TRANSITION METAL-CONTAINING SUPPORTED CATALYSTS

[75] Inventors: Ludwig Dorn; Manfred Mengel, both of Cologne; Gerhard Heinze, Schildgen, all of Germany

[73] Assignee: Bayer Aktiengesellschaft, Leverkusen, Germany

[22] Filed: July 30, 1971

[21] Appl. No.: 167,792

[30] Foreign Application Priority Data
Aug. 5, 1970 Germany.................... P 20 38 884.5

[52] U.S. Cl................. 252/448, 252/451, 252/454, 252/455 R, 252/456, 252/457, 252/458, 252/459, 252/460
[51] Int. Cl............................................ B01j 11/44
[58] Field of Search.................... 252/448, 451, 457

[56] References Cited
UNITED STATES PATENTS
2,900,349   8/1959   Schwartz............................ 252/451
2,487,065   11/1949  Milliken............................. 252/451
2,472,834   6/1949   Schexnailder et al. ............. 252/451

*Primary Examiner*—Patrick P. Garvin
*Attorney*—Ralph D. Dinklage et al.

[57] ABSTRACT

The process for the production of bead-form silica-containing supported catalysts containing transition metals in ionic or elemental form which comprises mixing a filler comprising an alkaline earth metal silicate with an aqueous dispersion of an inorganic oxide hydrate, converting this mixture into a solid bead-form granulate, calcining the granulate, at a temperature of about 500° to 750° C., and then treating the product with a solution of a transition metal salt, whereby the alkaline earth metal ions present in the granulate are replaced at least in part by transition metal ions. The aqueous dispersion is preferably silica sol and the filler calcium silicate, possibly admixed with kaolin, montmorillonite or attapulgite. After ion exchange, the granulate may be treated with hydrogen to reduce the transition metal ion.

9 Claims, No Drawings

PRODUCTION OF TRANSITION METAL-CONTAINING SUPPORTED CATALYSTS

This invention relates to a process for the production of bead-form supported catalysts containing metals of the Secondary Groups of the Periodic System of Elements (Transition metals) in ionic or elemental form in substantially atomic distribution on the surface of porous supports.

As a rule, supported catalysts which contain the catalytically active metal ions in atomically distributed form are more active and less sensitive to catalyst poisons than supported catalysts of the kind in which the corresponding metals are directly mixed and molded into shape with the supporting material in the form of their compounds in powder form.

The same applies as regards supported catalysts of the kind obtained simply by impregnating prefabricated supports with solutions of corresponding metal compounds, followed by removal of the solvent. Another advantage in particular of noble-metal-containing catalysts, providing the metals are atomically distributed as far as possible over the surface of the support, lies in the considerable reduction in costs in relation to the other supported catalysts referred to above.

It is known that supported catalysts in which the catalytically active metals are present in substantially atomic distribution can be obtained by ion exchange. Examples of ion exchange systems of this kind include synthetic and natural zeolites, permutites and a few laminar silicates, for example montmorillonites.

It is particularly the synthetic zeolites known as faujasite zeolites which are widely used as catalysts. Where they are used in heterogeneous gas reactions, they have to be formed into granulates either before or after ion exchange.

Despite their outstanding catalytic properties, granulates of this kind have two distinct disadvantages which seriously restrict their range of potential applications. Because of their extreme sensitivity to acids, the zeolites cannot be treated with acid exchange solutions and acid reaction gases, in addition to which moldings containing appreciable quantities of crystalline substances such as zeolites, for example, are frequently not mechanically strong enough to be used in moved catalyst beds, especially fluidized beds.

It is known that amorphous oxide hydrates of very weak acids obtained from aqueous medium, such as silica gels for example, have a number of OH groups on the surface of their primary particles which is governed by the pre-treatment of the material. Because of their extremely low acidity, the silanol groups for example at the surface of the silica gel are unable to exchange appreciable quantities of hydrogen ions for metal ions from acid or neutral solution. If, however, gels of this kind are treated with aqueous alkali liquor, the hydrogen atoms are replaced by alkali metal ions which in turn can be stoichiometrically replaced by other metal ions from metal salt solutions. A cation-exchanging silica gel of this kind can also be obtained by incomplete neutralization of a sodium silicate solution with a mineral acid.

Corresponding moldings containing alkali metal ions can be obtained by continuously mixing alkali metal silicate solutions with mineral acids and then allowing the gellable mixture to run into a water-immiscible solvent.

As already mentioned, the granulates can be left with a residual alkali metal content through incomplete neutralization. However, the residual alkali metal content is uncontrollably eliminated during the subsequent washing operation to remove the alkali metal salts.

In addition, gels of this kind are extremely fine-pored which complicates subsequent ion exchange with the solutions containing the transition metal ions, and subsequently reduces accessibility to the reaction gases.

Even the subsequent treatment of suitable preformed silica gel granulates with alkali liquor is not sufficient to produce optimal distribution of the alkali metal ions over the surface of the silica gel as can be seen from the partial dissolution or peptization of silica and the resulting obstruction or blockage of pores.

A process for the production of silica-containing gel grains, preferably in bead form, is known which starts with sodium silicate solution on the one hand and dilute sulfuric acid or aluminum sulfate on the other hand. The unstable hydrosol formed when the components are combined, having a life of, at the most, a few seconds only, is distributed in the form of droplets in an organic phase in which it solidifies into gel grains (German Patent Specification No. 896,189).

It is also known that solids in powder form can be stirred with aqueous stable silica sol to form a fluid suspension which is then mixed with comparatively small quantities of a second suspension of finely divided magnesium oxide in water and the gellable mixture of the two suspensions distributed in the form of droplets in a water-immiscible liquid until sol/gel conversion begins (DAS 1,189,588).

It is accordingly an object of the present invention to provide a simple process for producing a bead-form supported catalyst containing transition metals in substantially atomic distribution on the surface of a porous support.

This and other objects and advantages are realized in accordance with the present invention comprising the steps of mixing a filler comprising an alkaline earth metal silicate with an aqueous dispersion of an inorganic oxide hydrate, converting this mixture into a solid bead-form granulate, calcining the granulate at a temperature of about 500° to 750° C., and then treating the product with a solution of a transition metal salt, whereby the alkaline earth metal ions present in the granulate are replaced at least in part by transition metal ions. The product may then be washed, dried and optionally subjected to a reducing treatment.

It has now been found that silica fillers containing an alkaline earth metal, for example a standard calcium silicate filler of the kind obtained for example by variable precipitation processes from sodium silicate with calcium chloride solution, optionally in the presence of hydrochloric acid, when treated with solutions of transition metal salts, exchange their calcium ions for these metal ions. In addition, a relatively large quantity of the dissolved salt is retained through adsorption and is extremely difficult to remove even by washing the filler thus charged. If, however, the filler is subjected to calcination before it is treated with the metal salt solution, its adsorption capacity decreases with increasing calcination temperature although the ability of the calcium ions to exchange is not affected. In comparison with the described fillers containing alkali metal ions, these calcium silicate fillers have the advantage of a more uniform distribution and a firmer fixing of the calcium ions. Even prolonged exposure to the action of water or aqueous solutions is unlikely to result in appreciable dissolution of calcium hydroxide or in concentration of the hydroxide at individual points during drying or calcination. The pH value of these calcium silicate fillers in aqueous suspension is generally on the range of from eight to 11, depending upon the extent of washing out. In a suspension containing a stable silica sol, they do not produce any spontaneous gelation process in the absence of a gelling agent and, for this reason, are suitable for bead-forming even with stable sols.

The standard commercial calcium silicate fillers consist of spherical or sphere-like amorphous silica primary particles agglomerated into loose secondary agglomerates. The calcium ions are present at the surface of the primary particles. For a specific BET surface of up to 100 $m^2/g$, the CaO content can amount to a maximum of about 20 percent by weight; the minimum be as low as about 1 percent but advantageously is at least about 5 percent. If these calcium silicate fillers and also CaO-free fillers, are finely distributed in silica gel by conventional methods, they prevent the gel from shrinking to any appreciable extent during drying and, especially where ceramic binders (for example kaolin) are added, give abrasion-resistant materials with a pore size distribution which makes them particularly suitable for use as catalyst supports.

It has proved to be of particular advantage to use them in quantities of from about 20 to 60 percent by weight (based on the finished granulate) and preferably in quantities of from about 35 to 50 percent, in order to obtain these properties and to ensure that the starting mixture remains capable of being processed.

Calcium silicate fillers with a specific BET surface of from about 20 to 200 $m^2/g$ are suitable for use in the process according to the invention. Fillers with a specific surface of smaller than about 20 $m^2/g$ are as unsuitable for the production of the supporting materials according to the invention as the corresponding naturally occurring products such as diatomaceous earths. Granulates produced from them show inadequate strength. On the other hand, fillers with higher BET surfaces are less suitable for use in the process according to the invention because, on account of their excessively high activity, they often catalyze undesired secondary reactions.

In addition to the calcium silicate fillers, minerals containing aluminum oxide such as clays for example can also be added to the silica sol suspensions in the process according to the invention. Clay minerals from the group comprising kaolinite, montmorillonite and attapulgite, are particularly suitable. Apart from the fact that these additions of ceramic binders considerably increase the mechanical strength of the completed supports after drying and calcinations, they also improve the green strength of the still moist beads and, as a result, make the granulate easier to handle from the technological point of view in filters and on conveyors until finally it is dried.

The calcium silicate suspension is converted into bead granulates as known *per se* by adding a small quantity of a gelating reagent (for example an aqueous suspension of finely divided magnesium oxide) and dispersing the suspension in the form of droplets in an organic water-immiscible phase until the beginning of sol-gel conversion. Extremely small droplets of the kind required for the production of catalyst supports for the fluidized bed technique, can be dispersed by means of centrifugal plates or similar devices which accelerate the liquid film under the effect of centrifugal forces. Quantities of magnesium oxide of from 0.1 to 3 percent by weight, based on the dried grains, are usually sufficient for gelation.

Water-immiscilbe inert liquids such as, for example, liquid hydrocarbons, including their chlorinated derivatives such as, for example, perchlorethylene, trichlorethylene, o-dichlorobenzene etc. and mixtures thereof, are suitable for use as media for the sol/gel conversion.

In the process according to the invention, the catalyst support granulates produced by the sol/gel conversion process are subjected to calcination at about 500° to 750° C and preferably at about 600° to 700° C for at least 1 hour before they are treated with the metal salt solution and, on completion of ion exchange, are washed until the water used for washing is substantially free from salts. The object of this calcining treatment is on the one hand further to solidify the supporting granulate whilst, on the other hand, it seriously restricts the capacity of the supports for absorbing salts from aqueous solutions. In the absence of this calcining treatment, the supports as well as the free fillers would be capable not only of exchanging metal ions, but also of undesirably absorbing considerable quantities of salts from the solution which subsequently could only be removed with considerable difficulty by washing out.

The calcined and washed supporting granulate containing the calcium is then treated with aqueous solutions of simple or complex salts of transition metals, as a result of which the alkaline earth metal ions are exchanged either wholly or in part for the transition metal ions. The ion exchange takes place in known manner in an aqueous system by single or repeated treatment of the granules with the corresponding salt solutions. Thereafter it is washed with water to remove excess salt solution and the calcium ions formed by exchange, and subsequently dried.

In one preferred embodiment, the exchange with transition metal ions is carried out at a pH value just below, but at most two units below that pH value at which the corresponding metal hydroxide would be precipitated. The degree of exchange is higher, the nearer the pH value comes to this limit. Just below this limit, an almost complete exchange can be obtained with a number of ions. By contrast, the concentration of the exchange solution is of considerably less significance. The concentration generally amounts to between about 0.1 and 1 $m$, although it is also possible to use more dilute and more concentrated solutions.

In principle, exchange can be carried out with any transition metal ions. In the context of the invention, transition metals or transition elements include all elements of the First to Seventh Secondary Group and of the Eighth group of the Periodic System of Elements. It is possible in this way to produce for example the technically important nickel, copper, silver, cobalt, platinum and palladium catalysts as well as catalysts containing other transition metals such as vanadium, chromium, manganese, iron, zinc, rhenium, ruthenium, rhodium, cadmium, tungsten, osmium, iridium and/or gold.

The ion-exchanged supported catalysts can optionally be subjected to a reducing treatment in order completely or partly to convert the transition metal ions into the elemental state. The reducing treatment can be carried out in known manner for example with hydrogen or other reducing gases. However, the supported catalysts can also be reduced for example with borazanes or with hydrazine compounds.

The process according to the invention is illustrated by the following Examples:

EXAMPLE 1 a. 2,800 g of a silica filler precipitated from sodium waterglass with calcium chloride and hydrochloric acid and 1,200 g of kaolin were suspended by means of an intensive mixer in 10 liters of an aqueous silica sol (density 1.20 g/ml, 30 percent by weight of $SiO_2$) with a specific BET surface of 200 m²/g. The silica filler had a specific BET surface of 50 m²/g. It consisted of 75 percent of $SiO_2$, 8 percent of CaO and 17 percent of free and combined water. On this basis, the suspension had an approximate calculated composition, based on the dry substance by weight, of 47 percent of $SiO_2$ from the silica sol;
37 percent of silica filler; and
16 percent of kaolin or a chemical composition, based on the solids content (taking the chemical composition of the kaolin into account) of 90 percent of $SiO_2$
7 percent of $Al_2O_3$, and
3 percent of CaO Quantities of 10 liters per hour of the aforementioned suspension and 1.2 liters per hour of an aqueous magnesium oxide suspension containing 80 g of MgO per liter were continuously delivered by metering pumps to a mixing vessel from which the gellable mixture of the two suspensions ran on to a rotating distributor. From the distributor, the mixture ran in the form of thin streams into a column filled with o-dichlorobenzene arranged beneath the distributor. On entering the organic medium, the streams of the suspension disintegrated into spherical droplets which solidified as they sank through the onset of gelation. The granulate which was still shapable was separated off from the o-dichlorobenzene, dried in a stream of air and thereafter heated for 2 hours to 700° C. A bead-form extremely hard granulate with grain diameters of from 0.4 to 2 mm was obtained. It had a specific surface according to BET of 124 m²/g and a pore volume of 501 mm³/g. It contained 3.78 percent by weight of CaO.

b. Batches of 20 g of the granulate described in Example 1a) were treated while stirring for 2 hours at room temperature with mixtures of 50 ml of a 0.5 molar $CuCl_2$-solution and 50 ml of distilled water or hydrochloric acid with different degrees of concentration. During exchange, the pH value of the solutions rose to values between 3.7 and 4.0. Thereafter the granulate in each batch was separated off from its excess solution, decanted with 50 ml of water and stirred for 3 minutes with 100 ml of water. The exchange solutions and washing liquids of each were combined; the $Cu^{2+}$-content was determined therein by titration. The results are shown in Table 1.

TABLE 1

| Test | Exchange solution | pH value before exchange | Percent $Cu^{2+}$ content based on $Ca^{2+}$ used |
|---|---|---|---|
| A | 50 ml 0.5 m $CuCl_2$ + 50 ml 0.1 m HCl | 1.2 | 36.0 |
| B | 50 ml 0.5 m $CuCl_2$ + 50 ml 0.01 m HCl | 2.2 | 54.5 |
| C | 50 ml 0.5 m $CuCl_2$ + 50 ml 0.001 m HCl | 3.1 | 63.5 |
| D | 50 ml 0.5 m $CuCl_2$ + 50 ml 0.0001 m HCl | 3.8 | 74.8 |
| E | 50 ml 0.5 m $CuCl_2$ + 50 ml $H_2O$ | 3.7 | 89.0 |

EXAMPLE 2

50 g of a catalyst support prepared in the same way as described in Example 1a) were stirred for 1 hour with a mixture of 500 ml of a 0.98 molar $NiCl_2$ solution and 7.2 ml of a 0.1 molar hydrochloric acid with a pH value of 3.0, freed from the solution on a filter and then washed in portions with a total of 5 liters of water. In order to determine the degree of exchange, the nickel content of the solution combined with the washing water was determined. Based on the quantity of 33.75 millimoles of calcium present in the bead granulate used, the degree of exchange mounted to 35.0 percent for a nickel content of 12.0 millimoles. The product may thereafter be treated with hydrogen at 400° C to reduce the nickel.

EXAMPLE 3

600 ml of concentrated ammonia were added to 7 g of an $H_2(PtCl_6)$ solution (the solution constituting 30 percent by weight of Pt). The solution was concentrated to 100 ml, filtered and made up with distilled water to 500 ml. The resulting $Pt^{IV}$ ammonium chloride solution contained 4.2 mg of Pt/ml.

100 g of a catalyst support granulate of the kind described in Example 1a were treated for 2 hours while stirring at room temperature with 250 ml of the above solution, decanted and washed out with water. The support contained 1.0 percent by weight of Pt corresponding to 95 percent of the quantity of Pt originally used.

EXAMPLE 4

5.1 g of $PdCl_2$ (containing 60 percent of Pd) were dissolved under heat in 200 ml of concentrated ammonia. The solution obtained was concentrated until its pH value had fallen to a value in the range of from 8 to 9, and made up with distilled water to 500 ml. The resulting $(Pd(NH_3)_4)$ $Cl_2$-solution contained 6.16 mg of Pd/ml.

100 g of a catalyst support granulate of the kind described in Example 1a) were treated for 2 hours while stirring at room temperature with 200 ml of the above solution, decanted and washed out with water. The support contained 0.96 percent by weight of Pd corresponding to 78 percent of the quantity of Pd originally used.

Substantially similar results are obtained if an equivalent amount of barium chloride had been used to obtain the initial silica filler.

It will be appreciated that the instant specification and examples are set forth by way of illustration and not limitation and that various modifications and

What is claimed is:

1. The process for the production of bead-form silica-containing supported catalysts containing transition metals in ionic or elemental form which comprises mixing a filler comprising an alkaline earth metal silicate with an aqueous dispersion of silica and, converting this mixture into a solid bead-form granulate, calcining the granulate at a temperature of about 500° to 750° C., and then treating the product with a solution of a transition metal salt, whereby the alkaline earth metal ions present in the granulate are replaced at least in part by transition metal ions.

2. A process according to claim 1, wherein the alkaline earth metal silicate comprises calcium silicate.

3. A process according to claim 1, wherein the alkaline earth metal silicate comprises about 1 to 20 percent by weight of alkaline earth metal oxide.

4. A process according to claim 1, wherein the alkaline earth metal silicate added to the aqueous inorganic oxide hydrate dispersion comprises about 20 to 60 percent by weight of the calcined granulate.

5. A process according to claim 1, wherein the filler also comprises aluminum oxide.

6. A process according to claim 1, wherein the filler mixed into the dispersion comprises an alkaline earth silicate and up to about 30 percent by weight of the alkaline earth metal silicate of kaolinite, montmorillonite or attapulgite.

7. A process according to claim 1, wherein the pH of the solution of the transition metal salt is at most two units below that pH value at which the hydroxide of the transition metal would be precipitated.

8. A process according to claim 1, including the further step of treating the product with hydrogen thereby to reduce the transition metal ion.

9. A process according to claim 6, wherein the alkaline earth metal silicate comprises calcium silicate containing about 1 to 20 percent by weight of calcium oxide and is added in about 20 to 60 percent by weight of the calcined granulate, the ion exchange is effected at a pH no lower than about 2 units below the pH at which the hydroxide of the transition metal would precipitate, and the product is then washed, dried and reduced in hydrogen.

* * * * *

PO-1050
(5/69)

UNITED STATES PATENT OFFICE
CERTIFICATE OF CORRECTION

Patent No. 3,779,946      Dated December 18, 1973

Inventor(s) Ludwig Dorn et al

It is certified that error appears in the above-identified patent and that said Letters Patent are hereby corrected as shown below:

Col. 6, line 29, change "mounted" to --amounted--.

Col. 7, line 8, claim 1 - after "silica", cancel "and" and substitute therefor -- sol --.

Signed and sealed this 10th day of September 1974.

(SEAL)
Attest:

McCOY M. GIBSON, JR.
Attesting Officer

C. MARSHALL DANN
Commissioner of Patents